United States Patent
Klingels

(10) Patent No.: US 8,262,535 B2
(45) Date of Patent: Sep. 11, 2012

(54) PLANETARY GEAR

(75) Inventor: Hermann Klingels, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 1162 days.

(21) Appl. No.: 12/084,672

(22) PCT Filed: Nov. 4, 2006

(86) PCT No.: PCT/DE2006/001936
§ 371 (c)(1),
(2), (4) Date: May 7, 2008

(87) PCT Pub. No.: WO2007/054066
PCT Pub. Date: May 18, 2007

(65) Prior Publication Data
US 2009/0111639 A1 Apr. 30, 2009

(30) Foreign Application Priority Data
Nov. 12, 2005 (DE) .......................... 10 2005 054 088

(51) Int. Cl.
*F16H 57/08* (2006.01)
(52) U.S. Cl. ....................................... 475/347; 475/348
(58) Field of Classification Search .................. 475/347, 475/348
See application file for complete search history.

(56) References Cited

U.S. PATENT DOCUMENTS

| 5,558,594 | A | * | 9/1996 | Lefranc et al. ................ 475/347 |
| 6,223,616 | B1 | | 5/2001 | Sheridan |
| 6,364,805 | B1 | | 4/2002 | Stegherr |
| 7,104,918 | B2 | * | 9/2006 | Mitrovic ........................ 475/331 |
| 2003/0008748 | A1 | * | 1/2003 | Fox ............................... 475/346 |

FOREIGN PATENT DOCUMENTS

| DE | 2 235 448 | 2/1974 |
| DE | 23 39 882 | 2/1975 |
| DE | 198 44 843 | 4/2000 |
| WO | WO 2005/012761 | 2/2005 |

* cited by examiner

*Primary Examiner* — Edwin A Young
(74) *Attorney, Agent, or Firm* — Davidson, Davidson & Kappel, LLC

(57) ABSTRACT

A planetary gear train is described which includes a sun gear, three or more planet gears, an annulus as well as a planet gear carrier, whereby the input is provided via the sun gear and the output is provided via the annulus or via the planet gear carrier, whereby each planet gear is mounted on both sides in a roller bearing, and whereby the planet gear carrier includes two axially spaced bearing washers as well as at least three webs that connect the bearing washers. Each roller bearing is configured as a single-row or multi-row cylindrical roller bearing, each planet gear has a flexurally elastic axis projecting axially on both sides beyond the gear body of the planet gear, and the connection between each roller bearing and the appertaining axis is configured to be spherically moveable.

12 Claims, 3 Drawing Sheets

PLANETARY GEAR

This application is a national phase of International Application No. PCT/DE2006/001936, filed Nov. 4, 2006, which claims priority to German Application No. DE 10 2005 054 088.0, filed Nov. 12, 2005.

FIELD OF THE INVENTION

The invention relates to a planetary gear train comprising a central sun gear, three or more planet gears arranged around the sun gear in a radial plane so as to mesh with the sun gear, an annulus which surrounds and meshes with the planet gears, as well as a planet gear carrier on which the planet gears are mounted.

Therefore, this is the basic, simplest type of a planetary gear train in which the intermeshing gear wheels are arranged in a shared radial plane. The input is to be provided via the sun gear, as a result of which two possibilities exist for the output:

1) If the annulus is held stationary, the output is provided via the planet gear carrier, as a result of which the direction of rotation remains the same and the speed ratio (input to output) reaches a maximum.

2) If the planet gear carrier is held stationary, the output is provided via the annulus, as a result of which the direction of rotation reverses and the speed ratio becomes smaller than with type 1.

Instead of the designation "planetary gear train", technical circles also employ the designation "epicyclic gearing" although this is more applicable to type 1, with its stationary annulus.

BACKGROUND

German patent application DE 198 44 843 A1 discloses a special planetary gear train with so-called "stepped planets". Here, planet gears of different sizes are arranged in pairs in two radial planes that are at an axial distance from each other, whereby the larger planet gears mesh only with the sun gear while the small planet gears mesh only with the annulus. The two planet gears of each stepped planet are coupled via a shaft so as to be non-torsional. Each planet gear is mounted axially at the front and back of its gear body in a roller bearing, especially in a cylindrical roller bearing. This translates into a highly stressable, speed-resistant, low-friction and stiff bearing. Of course, this presupposes a correspondingly precise and sturdy planet gear carrier so that the load-bearing capacity of the bearings and toothing can actually be utilized.

The fact that each planet gear is mounted on both sides in a roller bearing is also advantageous for "simple" planetary gear trains of the above-mentioned type if large amounts of power are to be transmitted with low friction.

Even though roller bearings are bigger and more voluminous than slide bearings of a comparable load-bearing capacity, their advantages are that they entail little friction, even at low speeds, that they have good anti-seizing properties in case of insufficient lubrication and that they can tolerate dirt better.

In order to mount the planet gears on bearings on both sides, it is common practice to configure the planet gear carrier with two axially spaced bearing washers as well as with webs that connect the bearing washers. The webs are positioned in the gaps between the planet gears so that the number of webs usually corresponds to the number of planet gears. Here, the objective is to always connect the webs to the bearing washers so as to create the most dimensionally stable possible "cage". It is also a known procedure to apply and withdraw the force and torque on the planet gear carrier in its axial center via the webs in order to prevent unwanted deformations or asymmetries.

In spite of all of these measures, manufacturing tolerances, especially in the area of the planet gears and of the planet gear carrier, can give rise to local load peaks on the toothing and bearings, thus reducing the transmittable power and the service life of the gear train.

SUMMARY OF THE INVENTION

It is an objective of the embodiments of the present invention to provide a planetary gear train that, by means of load-compensation measures, makes it possible to increase the power throughput and/or the service life.

This objective is achieved by a planetary gear train comprising: a central sun gear; three or more planet gears arranged around the central sun gear in a radial plane wherein the planet gears mesh with the central sun gear; each planet gear being mounted on both sides axially at the front and back of a gear body in a roller bearing, each planet gear having a flexurally elastic axis projecting axially on both sides beyond the gear body, the connection between an inner ring of each roller bearing and an appertaining axis being configured to be spherically moveable like a ball-and-socket joint; an annulus surrounding and meshing with the planet gears; a planet gear carrier on which the planet gears are mounted, the planet gear carrier having two axially spaced bearing washers that support the roller bearing and three or more webs that connect the bearing washers, each roller bearing being configured as a single-row or multi-row cylindrical roller bearing; the sun gear providing input and the annulus providing output when the planet gear carrier is held stationary, or the sun gear providing input and the planet gear carrier providing output if the annulus is held stationary.

The provided roller bearings are configured according to the an embodiment of the present invention as single-row or multi-row cylindrical roller bearings that stand out for their high stressability, high rpm limit, low friction and compact design. Each planet gear has a flexurally elastic axis projecting on both sides beyond the gear body. This feature has a load-reducing effect on the bearing and on the toothing although, without additional measures, this could result in a skewed positioning of the inner ring of the bearing relative to the outer ring of the bearing, thus causing harmful edge loading of the rolling elements and bearing rings. For this reason, the mechanical connection between the inner ring of each roller bearing and the axis is configured to be spherically moveable like a ball-and-socket joint, so that the load-bearing capacity of each bearing can be fully utilized.

Preferably, the inner ring of each roller bearing is positively coupled to the associated planet gear by means of carry-along elements that act in the circumferential direction, as a result of which relative slipping movements between the inner ring and the axis or the gear body are avoided. In this context, permissible, elastic, relative radial movements between the inner ring and the gear body have to be taken into account.

It is likewise preferred that the webs of the planet gear carrier are coupled to the bearing washers in such a way that the bearing washers can be moved slightly relative to each other in their radial planes; they can be twisted with respect to each other especially in the circumferential direction. This is an intentional departure from the principle of the "stiff cage" in order to reduce load peaks in the bearing/toothing system that might have been caused by manufacturing tolerances.

BRIEF DESCRIPTION OF THE DRAWINGS

The invention will be explained in greater detail below making reference to the drawings, which show the following in a simplified, not-to-scale depiction.

DETAILED DESCRIPTION

Figure 1:
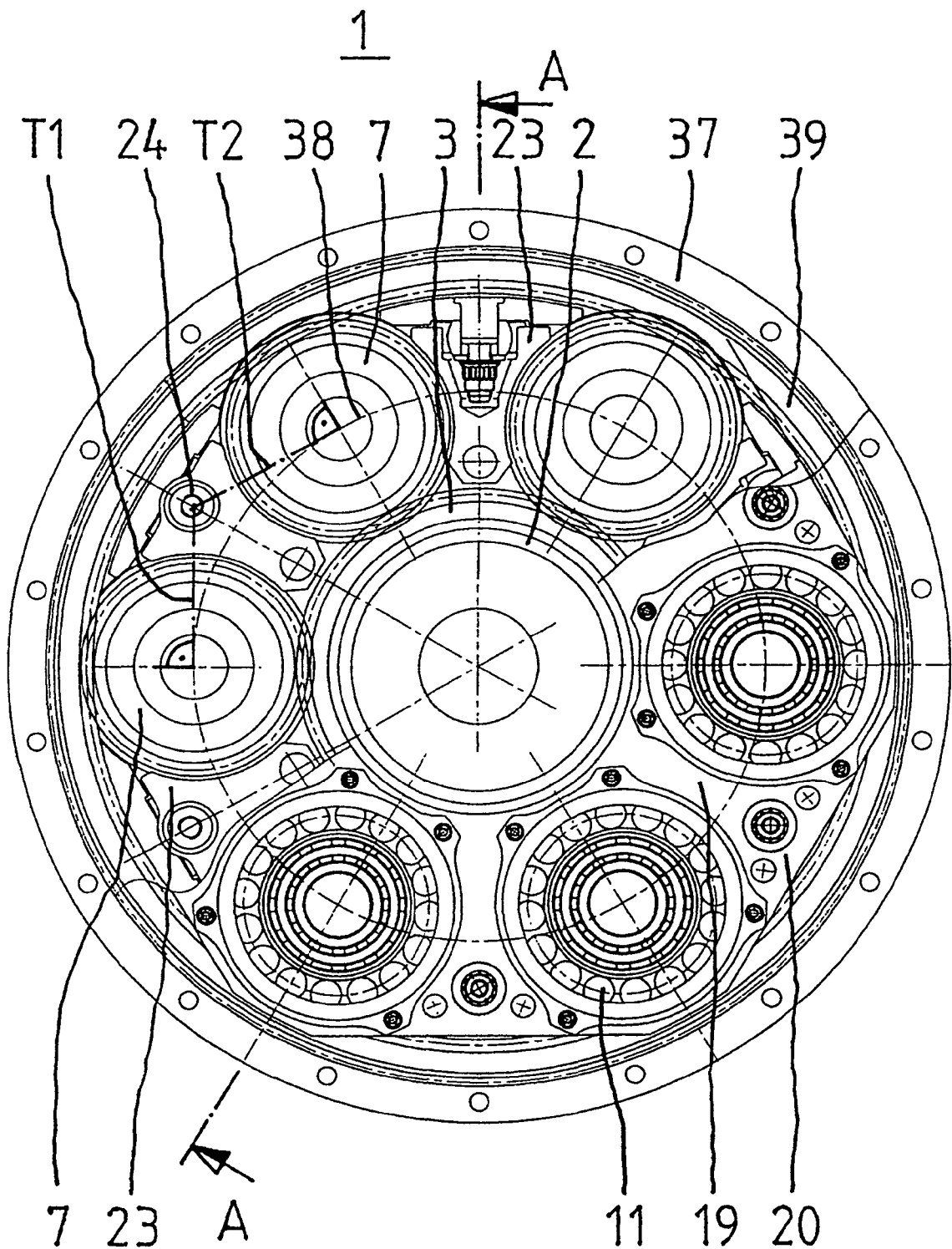
FIG. 1 shows a combination of a partial view of a planetary gear train and two partial cross sections through the same planetary gear train, whereby the viewing direction is always the same and runs axially.

For purposes of a better understanding, the graphic relationships between FIG. 1 and FIG. 2 will be explained first. FIG. 1 breaks down into three adjacent depiction areas in the form of circular sectors. The largest depiction area forms an approximately semi-circular sector (about 180°), that starts on the left-hand side of FIG. 1, approximately 45° below the horizontal center line, and extends downwards, to the right and upwards to approximately 45° above the horizontal center line. This depiction area corresponds to view B in FIG. 2 and shows primarily three roller bearings 11 consecutive to each other in the circumferential direction. Another depiction area on the left-hand side of FIG. 1 forms an approximately quarter-circular sector (about 90°) and extends from about 45° below the horizontal center line to about 45° above it. This depiction area corresponds to the sectional line C-C in FIG. 2 and shows, among other things, a planet gear 7 as well as two webs 23 of the planet gear carrier 19. The third and last depiction area likewise forms an approximately quarter-circular sector (about 90°) and extends at the top in FIG. 1 by about 45° on both sides of the vertical center line. This third depiction area corresponds to the sectional line D-D in FIG. 2 and shows, among other things, two planet gears 7 as well as a web 23 with structural details. Aside from showing the above-mentioned parts, FIG. 1 also shows the sun gear 3 with its driving shaft 2, the annulus 39 coupled to the shaft (not visible here) for the output, a bearing washer 20 of the planet gear carrier 19, journals 24 on the webs 23, the partial circle 38 of the six planet gears 7 as well as a support ring 27. Via the webs 23, the support ring 37 connects the planet gear carrier 19 in a non-torsional manner to the housing (not shown here) of the planetary gear train 1. The journals 24 on the webs 23 constitute the main load-transmitting elements between the webs 23 and the bearing washers 20. The centers of the journals 24 lie at least approximately at the intersection of two tangents T1 and T2 on the partial circle 38 of the planet gears 7, whereby the tangents T1, T2 each start from the gear centers of the planet gears 7 that are adjacent to each associated web 23. Calculations have shown that the resulting forces on the roller bearing 11 and thus the bearing washers 20 run approximately in the direction of said tangents on the partial circle 38.

Figure 2:
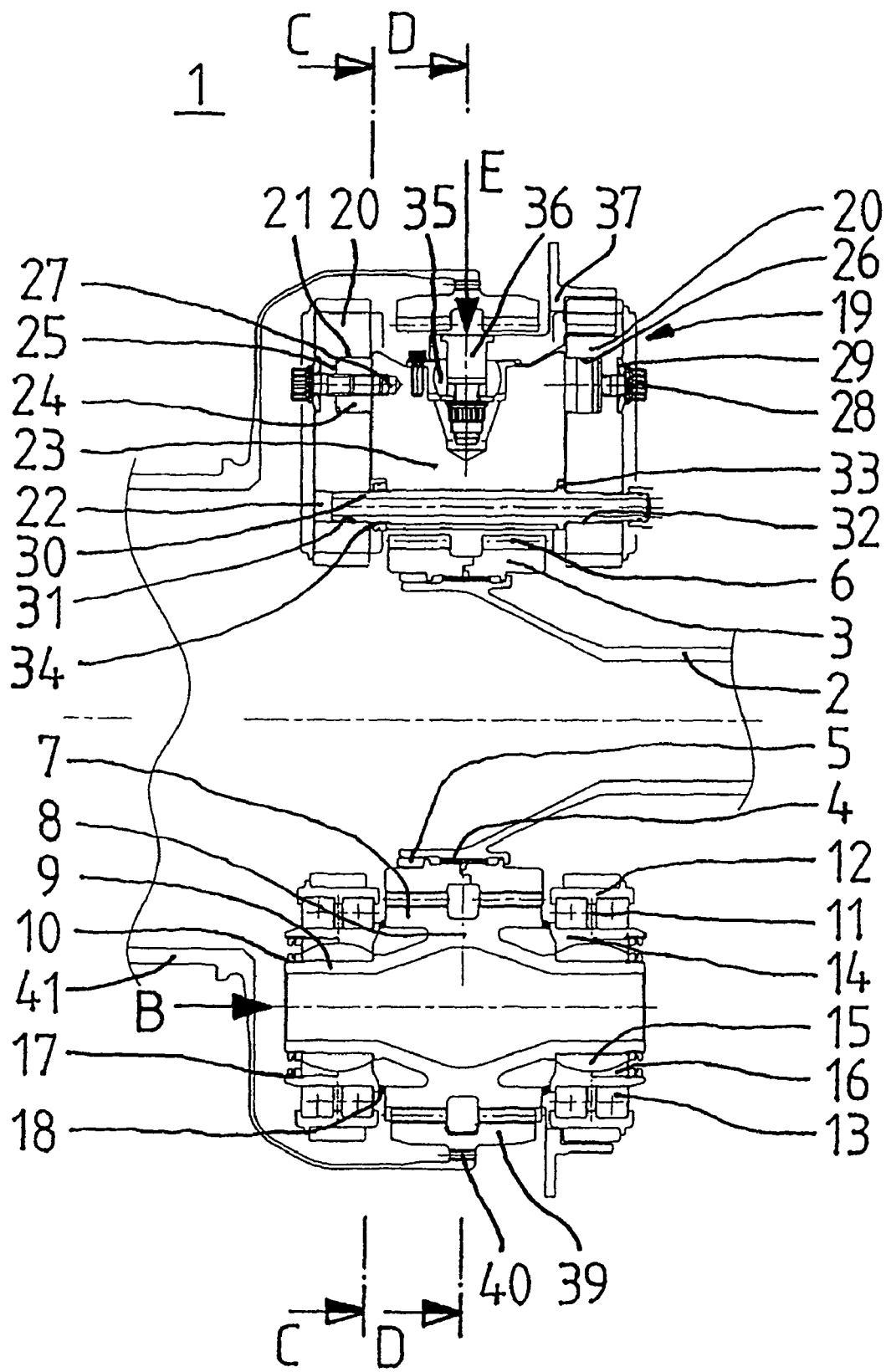
FIG. 2 shows a longitudinal section through the planetary gear train along the sectional line A-A in FIG. 1.

As already mentioned, FIG. 2 shows a longitudinal section through the planetary gear train along the sectional line A-A in FIG. 1. The line A-A combines two axial-radial sectional planes, of which the upper, vertical one runs through the center of a web 23 while the lower, slanted sectional plane runs through the center of a planet gear 7 and the associated roller bearing 11. The power flow through the planetary gear train 1 starts at the shaft 2 (input), runs via the planet gear 7 to the annulus 39 and the shaft 41 (output) connected to it. In the example shown, the planet gear carrier 19 is held statically fixed with respect to the housing. Within the scope of the invention, it would also be possible to hold the annulus statically and to withdraw the output power at the planet gear carrier, that is to say, to couple the planet gear carrier to the output shaft. These two possibilities differ—while the gearwheel geometries are the same—in terms of the direction of rotation and of the speed ratio between the input and the output. The present two-piece sun gear 3 is connected so as to be non-torsional and axially affixed to the shaft 2 by means of toothing 4 and a screwed connection 5. The toothing 6 of the sun gear 3 that meshes with the planet gears 7 is preferably configured as double helical gear teeth—similarly to herringbone teeth—with involute tooth faces. Like the herringbone teeth, this design, while allowing a more precise manufacture, entails the advantage that the meshing gearwheels center each other axially. The two-part design of the sun gear 3 allows for even more precise manufacture. The annulus 39 is connected in a non-torsional manner to the shaft 41 by means of toothing 40, whereby certain relative movements are intentionally allowed such as, for instance, axial shifts and small tilting movements. Depending on the toothing play, small relative radial movements are also a possibility. Each planet gear 7 comprises a gear body 8 with toothing that fits the sun gear 3 and the annulus 39, as well as a flexurally elastic axis 9 that extends axially on both sides beyond the gear body 8, whereby the gear body 8 and the axis 9 are preferably configured integrally. On each axis end, there is a roller bearing 11 configured as a single-row or multi-row cylindrical roller bearing which, in turn, comprises an outer ring 12, a plurality of rolling elements 13 and an inner ring 14. A joint ring 15 with a spherical outer contour is arranged between the axis 9 and the inner ring 14. By means of an additional retaining ring 16, the joint ring 15 is positively held on the inner ring 14, whereby the complementary, spherical inner contours of the inner ring 14 and of the retaining ring 16 allow a movement—like a ball-and-socket joint—of the roller bearing 11 relative to the joint ring 15, which is fixed with respect to the axis, and thus also relative to the axis 9. The joint ring 15 is affixed to the axis 9 by means of a screwed connection 10, the retaining ring 16 is attached to the inner ring 14 by means of a screwed connection 17. The fit in the area of the spherical sliding surfaces is selected in such a way as to allow a relative movement that is free of play but also free of constraining forces. It should be pointed out that the relative movements that are to be expected are very small, in other words, the magnitude of the pivoting motions will be well below one angular degree. Since the inner ring 14 of each roller bearing 11 should not twist in the circumferential direction relative to the axis 9 or to the gear body 8, particularly for reasons having to do with wear and tear, carry-along elements 18, for example, in the form of pins and grooves or bores or else of serrations, are arranged with a positive connection on the inner ring 14 and on the gear body 8. The carry-along elements 18 must not prevent the small pivoting motions of the roller bearing 11 on the joint ring 15 affixed to the axis, and this can be ensured by means of an appropriate play and/or elastic deformability. This roller bearing attachment, which is relatively complex, has the task of preventing so-called edge loading of the roller bearing 11. As already mentioned, the axes 9 of the planet gears 7 are configured to be flexurally elastic for reasons having to do with load and tolerance compensation, whereby the deflection of the axis ends in a conventional bearing seat would be transferred to the inner ring of the bearing. The attachment of the outer rings of the bearing on the planet gear carrier is relatively rigid, so that—in the conventional solution—this can result in a skewed positioning of the inner ring of the bearing relative to the outer ring of the bearing, in conjunction with the critical edge loading. This would be harmful, particularly for multi-row roller bearings having a wide bearing base. The present invention makes it possible to always set the inner ring 14 of the roller bearing 11 optimally with respect to the outer ring 12, as a result of which the load-bearing capacity and the service life are optimized. Therefore, the extra effort needed for this construction is completely warranted.

Other structural measures in terms of load and tolerance compensation are shown in the top half of FIG. 2. The planet gear carrier 19 comprises as main elements two axially spaced, essentially identical bearing washers 20 that support the roller bearing 11, as well as at least three, in the present case six, webs 23 that connect the bearing washers 20. The webs also serve to transmit the loads to the housing or to the shaft of the planetary gear train on the output side. As already mentioned, it is common practice to configure the planet gear carrier as the most rigid possible "cage" with correspondingly stiff connections between the webs and the bearing washers. With this approach, manufacturing imprecisions in the area of the planet gear carrier lead to load increases in the bearings and toothing, that is to say, to greater wear or shorter service life while the transmitted power remains the same. In contrast, according to the present invention, the connection between each web 23 and each bearing washer 20 should be configured to be only slightly moveable, to put it more precisely, to be configured so as to be articulated. For this purpose, a journal 24 is integrally shaped onto each side of the web 23, whereby the journals 24 are opposite from each other coaxially. A separate axis 30 runs radially inside and parallel to the two journals 24 through the web 23 and projects out of the latter on both sides, likewise like a journal. The journals 24 are accommodated in cylindrical depressions 21, while the axis 30 is accommodated in cylindrical bores 22 of the bearing washers 20. The journals 24 as well as the axis 30 have cambered contact surfaces 26, 32 along the circumference, said surfaces allowing a certain slanted positioning in the cylindrical depressions 21 or bores 22. In actual fact, radial pivot axes are created that run on both sides of the web 23 through the contact surfaces 26, 32 and through the centers of the journals 24 and of the axis 30. The journals 24 have threaded bores 27 in which screws 28 are located. By means of conical spring washers 29, the screws 28 press the depressions 21 in the bearing washers 20 axially against the end surfaces 25 of the journals 24. The axial depth of the depressions 21 is somewhat smaller than the axial length of the journals 24, so that the bearing washers 20 do not lie directly on the webs 23 but rather, they maintain a certain small axial distance from them. This facilitates small pivoting motions around the above-mentioned radial axes between the webs 23 and the bearing washers 20. It should also be pointed out that the axes 30 are configured to be hollow and are held in the web 23 by means of a collar 33 and a screwed connection 34. It is possible to introduce lubricating oil through the hollow axes 30. Instead of the separate axes 30, journals of the type designated by numeral 24 can be arranged on the web without changing the kinematics. To put it more precisely, the "virtual" pivot axes between the webs and the bearing washers should run not only radially and thus parallel, but rather, with a radial and an axial component, they should converge towards a central point on the gear axis. This central point would lie axially in the center plane of the toothing as the intersection with the gear axis. Then, the bearing washers could move relative to each other kinematically free of constraints, in the manner of a bevel gear differential. Since, in the case at hand, the relative movements that can be expected are very small, the approximate solution with radial, parallel pivot axes is sufficient, whereby constraints are absorbed elastically. The planet gear carrier 19 not only has the task of accommodating and guiding the planet gears 7 with their roller bearings 11, but also of forming a static support for the differential torque between the input and the output by means of a non-torsional connection with the housing of the planetary gear train 1, or else the task of dynamically relaying the gear power to the shaft on the output side. In the present case, the first variant is presented by way of an example. Here, a ball-and-socket joint 35 is detachably attached, especially screwed, to at least three of the webs 23, preferably to all of the webs 23, axially in the center between the bearing washers. As has been explained in conjunction with FIG. 1, the journals 24 constitute the main load-transmission points between the bearing washers 20 and the webs 23. For this reason, it is favorable for the flux of force to set the center of the ball-and-socket joint 35 approximately coaxially between the opposing journals 24. A bolt 36 is detachably connected to each ball-and-socket joint, said bolt forming a positive and/or non-positive transmission element to a support ring 37. The preferably integral support ring 37 has a flange that is detachably connected, preferably screwed, to the housing of the planetary gear train. This flange having a plurality of screw holes can be clearly seen in FIG. 1.

Figure 3:
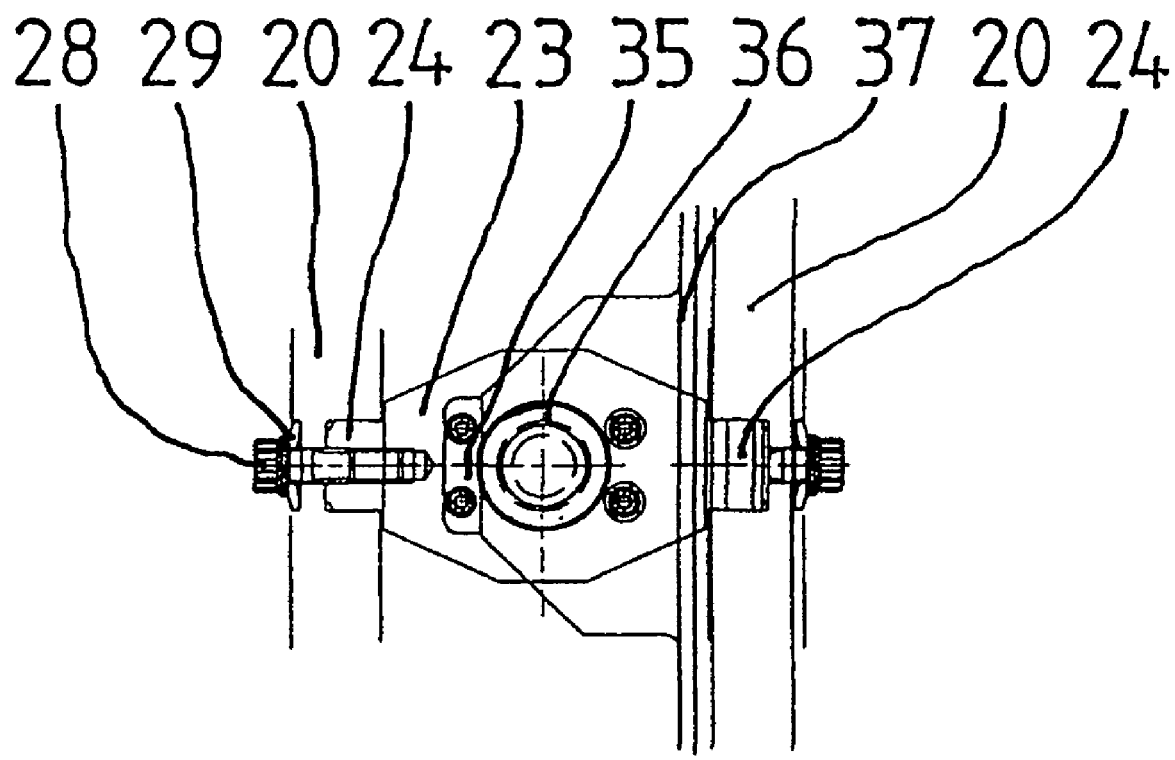
FIG. 3 shows a view of a partial area of the planet gear carrier of the planetary gear train from the viewing direction E in FIG. 2.

Finally, FIG. 3 shows the partial view E from FIG. 2 onto a web 23 with a ball-and-socket joint 35. One can see the axially spaced bearing washers 20, the main load-transmission journals 24 including the screws 28 and washers 29 as well as the web 23. Here, the ball-and-socket joint 35 is attached to the web 23 by means of four screws, whereby a suitable fit between the ball-and-socket joint 35 and the web 23 can largely relieve the load on the screws. Furthermore, the bolts 36 as well as the support ring 37 are also indicated. One can see that the support ring 37 has a tab-like projection surrounding the bolt 36 and that, for the rest, it extends circumferentially in the area of the bearing washer on the right-hand side.

What is claimed is:

1. A planetary gear train comprising:
    a central sun gear;
    three or more planet gears arranged around the central sun gear in a radial plane wherein the planet gears mesh with the central sun gear;
    each planet gear being mounted on both sides axially at the front and back of a gear body in a roller bearing, each planet gear having a flexurally elastic axis projecting axially on both sides beyond the gear body, the connection between an inner ring of each roller bearing and an appertaining axis being configured to be spherically moveable;
    an annulus surrounding and meshing with the planet gears;
    a planet gear carrier on which the planet gears are mounted, the planet gear carrier having two axially spaced bearing washers that support the roller bearing and three or more webs that connect the bearing washers, each roller bearing being configured as a single-row or multi-row cylindrical roller bearing;
    the sun gear providing input and the annulus providing output when the planet gear carrier is held stationary, or the sun gear providing input and the planet gear carrier providing output when the annulus is held stationary.

2. A gas turbine having the planetary gear train as recited in claim 1, the planetary gear train providing speed reduction between a low-pressure turbine and a fan of the gas turbine.

3. The planetary gear train as recited in claim 1, wherein the inner ring of each roller bearing is positively coupled to the gear body of the associated planet gear via carry-along elements that act in the circumferential direction, the carry-along elements having a defined radial and circumferential play and/or elastic deformability so as to be tolerant of load-induced relative radial movements between the inner ring and the gear body.

4. The planetary gear train as recited in claim 3, wherein the carry-along elements that act in the circumferential direction are teeth, pins, grooves and/or bores.

5. The planetary gear train as recited in claim 1, wherein the webs connecting the bearing washers of the planet gear carrier are coupled to the bearing washers, the bearing washers moving slightly relative to each other in their radial planes and twisting slightly with respect to each other in the circumferential direction.

6. The planetary gear train as recited in claim 5, wherein the webs are detachably attached to the bearing washers by one or more positive force-transmitting elements allowing small pivoting motions around radial axes and one or more screwed connections.

7. The planetary gear train as recited in claim 6, wherein the one or more force-transmitting elements comprise two integral, coaxial journals; a separate axis on each web; and depressions and bores on the bearing washers.

8. The planetary gear train as recited in claim 7, wherein the two integral, coaxial journals and the separate axis on each web have cambered contact surfaces; each coaxial journal forming a part of one or more screwed connections, the separate axis being hollow.

9. The planetary gear train as recited in claim 8, wherein the one or more screwed connections include a screw; a threaded bore in a journal of a web; and an axially elastically deformable conical spring washer.

10. The planetary gear train as recited in claim 7, wherein the coaxial journals being main force-transmitting elements between the bearing washers and the webs; each coaxial journal lying with their center points approximately at the intersection of two tangents on a partial circle of center points of the planet gears in the axial viewing direction onto the planet gear carrier, the two tangents each starting from the center points of two adjacent planet gears.

11. The planetary gear train as recited in claim 1, wherein force-transmitting elements are arranged on the planet gear carrier in a plane situated axially in the center between the two axially spaced bearing washers on the three or more webs.

12. The planetary gear train as recited in claim 11, wherein the force-transmitting elements and the three or more webs having screwed ball-and-socket joints, the screwed ball-and-socket joints having center points on the longitudinal center axes of coaxially opposing journals.

* * * * *